United States Patent Office

2,995,522
Patented Aug. 8, 1961

2,995,522
CLEANING COMPOSITIONS AND METHODS
Ronald S. Joyce, Upper St. Clair Township, Pa., assignor to Nalco Chemical Company, a corporation of Delaware
No Drawing. Filed Dec. 9, 1957, Ser. No. 701,304
7 Claims. (Cl. 252—105)

This invention relates to a process of removing insoluble compounds of iron from surfaces upon which these compounds have been deposited. Specifically, it relates to compositions and processes for cleaning cation exchange resins which have been contaminated or fouled with insoluble compounds of iron.

Waters containing amounts of soluble iron compounds, when exposed to the atmosphere, tend to form precipitates which deposit on many types of surfaces. Common occurrences of this phenomenon are the so-called "rust" stains which appear on such items as bathtubs, glassware and other similar types of surfaces which come in contact with water. A particularly annoying and wasteful phenomenon is the fouling of cation exchange resins by the deposition of insoluble iron compounds in, on and between the surfaces of the resin particles. When this fouling occurs in home or domestic softening units, the owner is plagued with red or black colored water which is unsightly and which will form deposits on sinks, glassware, and other household appliances which normally are used in contact with water.

A common method for removing iron stains of the type described is to use either solutions or powdered forms of sodium hydrosulfite. Sodium hydrosulfite has performed satisfactorily for removing iron stains from various types of surfaces and has also been employed in cleaning iron fouled cation exchange resins. It would be extremely beneficial, however, if compositions were available which act upon insoluble compounds of iron whereby they could be readily removed from surfaces which they disfigure and mar and would also be useful in the cleaning of fouled cation exchange resins, particularly those used in domestic softening units.

It therefore becomes an object of the invention to provide new compositions useful in the cleaning of insoluble compounds of iron from surfaces containing such compounds in the form of stains or discolorations.

Another object is to provide compositions and processes for cleaning cation exchange resins which have been contaminated with insoluble compounds of iron. Other objects will appear hereinafter.

In accordance with the invention it has been found that insoluble compounds of iron which contaminate non-fibrous solid surfaces, may be readily cleaned and removed by using as a cleaning agent compositions of the following general formula:

GENERAL FORMULA

| Ingredients: | Percent by weight |
|---|---|
| An alkali metal hydrosulfite | 79–90 |
| An alkali metal bisulfite | 10–30 |

A specific formula of the general type enumerated above consists of 70% by weight of sodium hydrosulfite and 30% by weight of sodium bisulfite. These compositions, while being useful in cleaning such surfaces as porcelain, enamel ware, and glass, are particularly beneficial when used in the cleaning of fouled cation exchange resins. As will be demonstrated later, formulae of the invention are exceedingly more effective than sodium hydrosulfite alone, and in some instances are 78% more effective.

When used to clean solid surfaces, such as porcelain and glassware, the compositions may be used in the form of a powder which is applied to the surface, moistened with a minor amount of water and then rubbed into the contaminated area.

When used in the treatment of cation exchange resins, however, a definite set of procedural operations should be followed to achieve maximum effectiveness. In general, these procedural steps consist of:

(1) Placing the resin in the alkali metal salt form.

(2) Treating the resin with an alkali metal salt solution containing an amount of the compositions of the invention whereby the treatment dosage is at least one pound per cubic foot of resin, with contact time being sufficient to remove the insoluble compounds from the resin.

(3) Regenerating the treated resin with a solution of an alkali metal halide.

While the above steps should be followed for maximum effectiveness, it will be understood that minor deviations may be used without departing from the scope of the invention. For instance, the concentration of the alkali metal salt solution, which contains the cleaning reagent, may vary from as little as 2% by weight up to as high as 20% by weight of alkali salt. Most generally, however, salt solutions of approximately 5% to 15% by weight will be more than adequate. The amount of the cleaning reagent necessary may vary from as little as one pound per cubic foot of resin to as much as 6 pounds per cubic foot, but generally, it is only necessary to use between two to four pounds per cubic foot. The contact time of the treating solution with a fouled cation exchange resin may vary from fifteen minutes to as long as several hours, with good results being obtained in many cases with contact times ranging from one-half to two hours.

The contact time as well as the strength of the reagent solution may vary, depending upon the particular cleaning operation involved. In some instances, superior results are achieved by using repeated cleaning operations, the cumulative effect of which is greater than a single cleaning operation using a strong solution of the cleaning reagent and a long contact time.

The compositions of the invention may be used to clean cation exchange resins which are contaminated with iron by merely using solutions of these materials in the concentrations specified above without following the procedural steps previously outlined. If the procedural steps are not followed, it becomes necessary to clean the resins thoroughly with exhaustive back-washings to insure that insoluble compounds formed during the cleaning operation do not remain in contact with the resins or the equipment containing the resins. If the preferred cleaning techniques are used, it is a simple matter to completely remove the objectional iron compounds from the resin and have the cation exchange material ready to operate in the softening cycle within a very short period of time. To demonstrate the efficacy of the invention, the following experimental test procedures were used:

(A) LABORATORY TESTS

Apparatus

A sample of iron fouled HCR (see U.S. Patent 2,366,007) containing 328 grams Fe/cu. ft. was used for all of the tests. In each case a 50 ml. (0.00177 cu. ft.) bed of this resin was treated in a conditioning column.

Test procedure (1) The resin was regenerated with salt at a level of 6 lbs./cu. ft. applied as a 10% solution for a 30-minute contact time.

(2) The reagent to be tested was dissolved in a volume of 10% salt solution corresponding to a level of 6 lbs.

per cubic foot. This solution was allowed to percolate through the bed for the contact time specified below.

(3) Step 1 was repeated.

(4) The resin was rinsed with 100 ml. of deionized water at the same flow rate used for the treatment.

(5) The combined effluents from steps 2, 3 and 4 were diluted to one liter and total iron was determined by a thioglycollate-colorimetric procedure.

(B) FIELD TEST

This test was carried out on a 3 cubic foot bed of HCR (containing 258 gm. Fe/cu. ft.) at a residence located in the Chicago, Illinois, area.

(1) The softener was regenerated in the usual manner (15 lbs. of salt per cubic foot).

(2) After a short rinse the water in the free board was drained to bed level.

(3) A solution consisting of 6 lbs. of a 70% hydrosulfite-30% bisulfite mixture and 18 lbs. of salt dissolved in approximately 12 gallons of tap water was allowed to percolate slowly through the bed over a one and one-half hour period.

(4) The bed was backwashed thoroughly.

(5) The softener was regenerated and rinsed in the usual manner.

(6) A week later the complete treatment described above was repeated by the owner using a slightly longer contact time and recycling the spent hydrosulfite solution through the bed.

The total amounts of iron on the resins used were determined by elution of the resin with 6 N hydrochloric acid and determining the iron content of the eluate by the thioglycollic acid colorimetric procedure.

The data obtained in the laboratory tests are summarized in the following tables:

EXAMPLE I

*Effect of sodium bisufite concentration in sodium hydrosulfite-sodium bisulfite mixtures for the cleanup of iron fouled HCR*

TABLE I

| Test No. | Concentration (percent by Weight) | | Iron Removed (gms./cu. ft.) | Percent |
|---|---|---|---|---|
| | $NaHSO_3$ | $Na_2S_2O_4$ | | |
| 1 | | 100 | 100.5 | 32.0 |
| 2 | 10 | 90 | 150.0 | 45.7 |
| 3 | 20 | 80 | 141.0 | 43.0 |
| 4 | 30 | 70 | 178.0 | 54.2 |
| 5 | 40 | 60 | 0 | 0 |
| 6 | 100 | | 0 | 0 |

From Table I it will be seen that mixtures of sodium bisulfite and hydrosulfite in the preferred combinations set forth herein give a cleanup far superior to that obtained by using sodium hydrosulfite alone. As the concentration of the sodium bisulfite was increased to 40%, a dense white precipitate formed in the test solution which rendered its passage through the exchange bed impossible. Sodium bisulfite, when used alone, gave no results whatsoever.

EXAMPLE II

*Effect of reagent level on the efficiency of sodium hydrosulfite-sodium bisulfite mixtures for the cleanup of iron fouled HCR*

TABLE II

| Test No. | Reagent Level (lbs./cu. ft.) | Iron (gms./cu. ft.) | Removed Percent |
|---|---|---|---|
| 7 | 1 | 73.5 | 22.2 |
| 8 | 2 | 178.0 | 54.2 |
| 9 | 3 | 201.0 | 61.2 |
| 10 | 4 | 201.0 | 61.2 |

Table II demonstrates that increasing the reagent level from one to two pounds more than doubled the quantity of iron removed. However, the use of three pounds of the mixture resulted in the removal of only any additional 7%, while four pounds was no more effective than three pounds.

EXAMPLE III

*Effect of contact time, temperature and repeated treatments on the efficiency of 70% sodium hydrosulfite—30% sodium bisulfite mixture for the cleanup of iron fouled HCR (2 lbs./cu. ft. reagent level in each case)*

TABLE III

| Test No. | Contact Time (Hours) | Temperature, °F. | Iron (gms./cu. ft.) | Removed Percent |
|---|---|---|---|---|
| 11 | ½ | 75 | 178 | 54.3 |
| 12 | 1 | 75 | 186 | 56.8 |
| 13 | 2 | 75 | 186 | 56.8 |
| 14 | ½ | 180 | 127 | 38.7 |
| 15 | { 1½ / ½ | (1) 75 / (2) 75 | { 178 / 92.8 } 270.8 | { 54.3 / 28.3 } 82.6 |

[1] Two successive complete treatments.

The use of hot water (Test No. 14), to dissolve the reagent decreases the efficiency. This is probably due to the rapid decomposition of the hydrosulfite before the resin was contacted by the solution. It can be seen that two successive treatments using two pounds of reagent in each treatment, removed 82% of the iron (Test No. 15), whereas a single treatment using four pounds of the reagent, removed only 61% (Test No. 10, Table II).

EXAMPLE IV

*Results obtained in the treatment of a three cubic foot domestic softener with a 70% hydrosulfite—30% bisulfite mixture*

TABLE IV

| | Iron on Resin (gms./cu. ft.) | Cumulative Amount Removed | |
|---|---|---|---|
| | | (gms./cu. ft.) | Percent |
| Fouled Resin | 258 | | |
| After 1st Treatment | 161 | 97 | 37.5 |
| After 2nd Treatment | 32.2 | 225.8 | 87.5 |

This table indicates the overall effect of two treatments on the iron-fouled domestic exchanger. The iron removal experienced in the field was higher than iron removal in the laboratory (Test No. 15, Table III).

EXAMPLE V

A home owner was given a small sample of composition which contained 70% by weight of sodium hydrosulfite and 30% by weight of sodium bisulfite and was requested to use the material to clean iron stains which he was experiencing on the surface of a porcelain bathtub and washstand. The material was sprinkled on the surface and rubbed into the stains, using a damp cellulose sponge. After rubbing for less than a minute, the stains were gradually removed, and after two minutes no trace of the stains could be seen. The home owner commented he had not been able to remove these stains using several commercial preparations, which he had obtained on the open market.

Reference has been made throughout this application to cation exchange resins. It is to be understood that the compositions and processes herein described can be used to treat any cation exchanger, either organic or inorganic. The invention is particularly well suited to cleaning infusible, insoluble sulfonated copolymers of monovinylaryl and polyvinylaryl compounds such as sulfonated copolymers of styrene and divinylbenzene of the type described in U.S. Patent 2,366,007. Other types of cation exchanger both organic and inorganic are described in the book, Ion Exchange Technology by F.C. Nachod and J. Schubert, Academic Press (1956).

The expression, "insoluble compounds of iron" is meant to include any compound of iron which is commonly precipitated from water which contacts the atmosphere or which is introduced into the water by contact with ferrous metal surfaces. In most cases, these insoluble compounds of iron will be predominantly ferric oxide, with other oxides of iron also being present.

The expression "alkali metal" as used herein is meant to include lithium, sodium, potassium, cesium and rubidium.

The invention is hereby claimed as follows:

1. A composition useful in the cleaning of non-fibrous solid surfaces which are contaminated with insoluble compounds of iron which consists essentially of:

| Ingredients: | Percent by weight |
|---|---|
| An alkali metal hydrosulfite | 70–90 |
| An alkali metal bisulfite | 10–30 |

2. A composition useful in cleaning of non-fibrous, solid surfaces which are contaminated with insoluble compounds of iron which consists essentially of:

| Ingredients: | Percent by weight |
|---|---|
| Sodium hydrosulfite | 70 |
| Sodium bisulfite | 30 |

3. The process of removing insoluble compounds of iron from non-fibrous solid surfaces contaminated therewith which comprises contacting these surfaces with an aqueous solution of a composition of the formula:

| Ingredients: | Percent by weight |
|---|---|
| An alkali metal hydrosulfite | 70–90 |
| An alkali metal bisulfite | 10–30 |

4. The process of removing insoluble compounds of iron from non-fibrous, solid surfaces which comprises contacting these surfaces with an aqueous solution of a composition of the formula:

| Ingredients: | Percent by weight |
|---|---|
| Sodium hydrosulfite | 70 |
| Sodium bisulfite | 30 |

5. The process of claim 3 where the non-fibrous solid surface is a cation exchange resin.

6. The process of claim 4 where the non-fibrous solid surface is a cation exchange resin.

7. The process of removing insoluble compounds of iron deposited on and in cation exchange resins which comprises the sequential steps of:
(1) converting the resin in the alkali metal salt form,
(2) treating the resin with an alkali metal salt solution containing an amount of the composition of claim 1 sufficient to produce a dosage of at least one pound per cubic foot of resin and for a period of time sufficient to remove the insoluble iron compounds from said resin, and
(3) regenerating the treated resin with a solution of an alkali metal halide.

References Cited in the file of this patent

UNITED STATES PATENTS

| | | |
|---|---|---|
| 1,151,416 | Stevenot | Aug. 24, 1915 |
| 1,321,182 | Allen | Nov. 11, 1919 |
| 1,918,873 | Scribner | July 18, 1933 |
| 2,393,865 | Wassell | Jan. 29, 1946 |
| 2,472,684 | Rossi | June 7, 1949 |

FOREIGN PATENTS

| | | |
|---|---|---|
| 46,890 | Austria | Mar. 10, 1911 |
| 165,546 | Austria | Mar. 10, 1950 |
| 54,307 | Switzerland | Oct. 24, 1910 |

OTHER REFERENCES

Ion Exchange Technology by Nachod et al., pages 236, 242 and 249 (1956).

---

UNITED STATES PATENT OFFICE

CERTIFICATE OF CORRECTION

Patent No. 2,995,522                 August 8, 1961

Ronald S. Joyce

It is hereby certified that error appears in the above numbered patent requiring correction and that the said Letters Patent should read as corrected below.

Column 1, line 58, for "79-90" read -- 70-90 --.

Signed and sealed this 19th day of December 1961.

(SEAL)
Attest:

ERNEST W. SWIDER                              DAVID L. LADD
Attesting Officer                                Commissioner of Patents

UNITED STATES PATENT OFFICE
CERTIFICATE OF CORRECTION

Patent No. 2,995,522                                            August 8, 1961

Ronald S. Joyce

It is hereby certified that error appears in the above numbered patent requiring correction and that the said Letters Patent should read as corrected below.

Column 1, line 58, for "79-90" read -- 70-90 --.

Signed and sealed this 19th day of December 1961.

(SEAL)
Attest:

ERNEST W. SWIDER
Attesting Officer

DAVID L. LADD
Commissioner of Patents